US 8,160,729 B2

United States Patent
Ahmed

(10) Patent No.: US 8,160,729 B2
(45) Date of Patent: Apr. 17, 2012

(54) APPLICATION OF MICROSYSTEMS FOR A BUILDING SYSTEM EMPLOYING A SYSTEM KNOWLEDGE BASE

(75) Inventor: Osman Ahmed, Hawthorn Woods, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 828 days.

(21) Appl. No.: 11/516,463

(22) Filed: Sep. 6, 2006

(65) Prior Publication Data
US 2007/0100479 A1    May 3, 2007

Related U.S. Application Data

(60) Provisional application No. 60/714,318, filed on Sep. 6, 2005.

(51) Int. Cl.
*G05B 13/02* (2006.01)
(52) U.S. Cl. ............... 700/47; 700/49; 700/276; 340/3.1
(58) Field of Classification Search .............. 700/47, 700/49, 276, 28–31; 706/48; 340/3.1
See application file for complete search history.

(56) References Cited

U.S. PATENT DOCUMENTS

| 5,562,537 | A | 10/1996 | Zver et al. |
| 5,971,597 | A * | 10/1999 | Baldwin et al. ............... 700/277 |
| 6,137,403 | A | 10/2000 | Desrochers et al. |
| 6,199,575 | B1 | 3/2001 | Widner |
| 6,625,500 | B1 | 9/2003 | Li |
| 7,308,323 | B2 * | 12/2007 | Kruk et al. ...................... 700/32 |
| 7,349,765 | B2 * | 3/2008 | Reaume et al. ............... 700/295 |
| 7,382,271 | B2 * | 6/2008 | McFarland ................ 340/686.6 |
| 2001/0025349 | A1 | 9/2001 | Sharood et al. |
| 2001/0040509 | A1 | 11/2001 | Dungan |
| 2004/0008651 | A1 | 1/2004 | Ahmed |

(Continued)

FOREIGN PATENT DOCUMENTS

EP    0 068 289    1/1983

(Continued)

OTHER PUBLICATIONS

Arzen, K.E.. "Using Real-Time Expert Systems for Control System Prototyping." *Institute of Electrical and Electronics Engineers. Proceedings of the International Conference on Systems, Man and Cybernetics*. Oct. 17-20, 1993. pp. 25-30. IEEE, New York. vol. 3.

*Primary Examiner* — Kakali Chaki
*Assistant Examiner* — Sheela S Rao

(57) ABSTRACT

An arrangement for use in a control system within a building includes a plurality of sensor microsystems (12, 406, 407, 408) configured to obtain environmental information regarding a plurality of areas in a building and a processing circuit (18, 318, 412, 416). The processing circuit is operable to obtain data representative of the environmental information regarding the plurality of areas in the building under a first set of operating parameter values. The processing circuit (18, 318, 412, 416) is further operable to change an operating parameter and obtain data representative of the environmental information regarding the plurality of areas under the changed set of operating parameter values. The processing circuit (18, 318, 412, 416) is also operable to store the data representative of the environmental information under the changed operating parameter values in a knowledge base. At a subsequent time, the processing circuit employs (18, 318, 412, 416) the knowledge base to adjust the operating parameter values.

20 Claims, 8 Drawing Sheets

U.S. PATENT DOCUMENTS

| | | |
|---|---|---|
| 2004/0019392 A1 | 1/2004 | Hirai |
| 2004/0030420 A1* | 2/2004 | Ulyanov et al. ................ 700/48 |
| 2004/0088082 A1 | 5/2004 | Ahmed |
| 2004/0144849 A1 | 7/2004 | Ahmed |
| 2006/0010388 A1 | 1/2006 | Imhof et al. |
| 2007/0043476 A1* | 2/2007 | Richards et al. ............. 700/276 |
| 2007/0055760 A1* | 3/2007 | McCoy et al. ................ 709/223 |

FOREIGN PATENT DOCUMENTS

| | | |
|---|---|---|
| EP | 1 696 371 | 8/2006 |
| WO | WO 99/57697 | 11/1999 |
| WO | WO 00/54237 | 9/2000 |
| WO | WO 01/26330 | 4/2001 |
| WO | WO 01/35190 | 5/2001 |
| WO | WO 01/93220 | 12/2001 |
| WO | WO 2004/038525 | 5/2004 |

* cited by examiner

APPLICATION OF MICROSYSTEMS FOR A BUILDING SYSTEM EMPLOYING A SYSTEM KNOWLEDGE BASE

This application claims the benefit of U.S. Provisional Patent Application Ser. No. 60/714,318, filed Sep. 6, 2005, which is incorporated herein by reference.

FIELD OF THE INVENTION

The present invention relates generally to building automation systems.

BACKGROUND OF THE INVENTION

Buildings in which people work and live have systems that monitor and sustain the comfort level of the building environment. Such systems include heating, ventilation and air conditioning (HVAC) systems, lighting systems, as well as others. HVAC and lighting systems have existed, at least at some level, for thousands of years.

HVAC and lighting systems have become sophisticated, and are often able to maintain careful balances of humidity and temperature, as well as provide some fresh air and adequate light within buildings. Such sophisticated systems are often called building automation systems. Building automation systems also include other building-related functions, including but not limited to security and fire safety systems.

The most sophisticated of current building automation systems are, at best, information centric. Such systems provide information of what is taking place for comfort, safety, and security. Such information may be presented in the form of charts and graphs of data points (i.e. temperature, flow, etc.).

Some need exists to obtain more information regarding the systems of a building and to use such additional information to improve building automation system operation.

SUMMARY OF THE INVENTION

Accordingly, the present invention may facilitate a building automation system ("BAS") that is increasingly knowledge-based, and in some embodiments is able to learn more about system operation through experimentation and/or experience. A more comprehensive granular operating knowledge of a building, its energy consumption and characteristics, and its environment is employed to maintain a sustainable building environment that is less costly to own and operate, advantageously uses its resources, and keeps the building comfortable, productive, safe, and secured.

In some embodiments, such a knowledge-centric BAS can be developed by integrating three core technology platforms: A micro-system based BAS distributed sensing; a building mesh wireless communication network, and finally, a knowledge management system that can process large amounts of data in order to extract meaningful knowledge that is useful to the building professionals and/or to future control operations. Another feature of such building will be to create a machine-to-machine network that will connect building objects automatically and the objects may often take actions and decisions autonomously or semi-autonomously.

A first embodiment is an arrangement for use in connection with a control system within a building that includes a plurality sensor microsystems and a processing circuit. The plurality of sensor microsystems are configured to obtain environmental information regarding a plurality of areas in a building. The processing circuit is operable to obtain data representative of the environmental information regarding the plurality of areas in the building under a first set of operating parameter values. The processing circuit is further operable to cause the building control system to operate under second set of operating parameter values, wherein a first parameter of the operating parameters has a changed value. The processing circuit is further operable to obtain data representative of the environmental information regarding the plurality of areas under a second set of operating parameter values and store the data representative of the environmental information under the second set of operating parameter values in a knowledge base. At a subsequent time, the processing circuit employs the knowledge base to adjust the operating parameter values.

Additional advantages may be obtained even if a wireless network is employed. The use of microsystems and a wireless network provide additional advantages of facilitating the provision of the amounts of data to significantly enhance the capability of the knowledge based system.

The above described features and advantages, as well as others, will become more readily apparent to those of ordinary skill in the art by reference to the following detailed description and accompanying drawings.

DETAILED DESCRIPTION OF THE DRAWINGS

Figure 1:
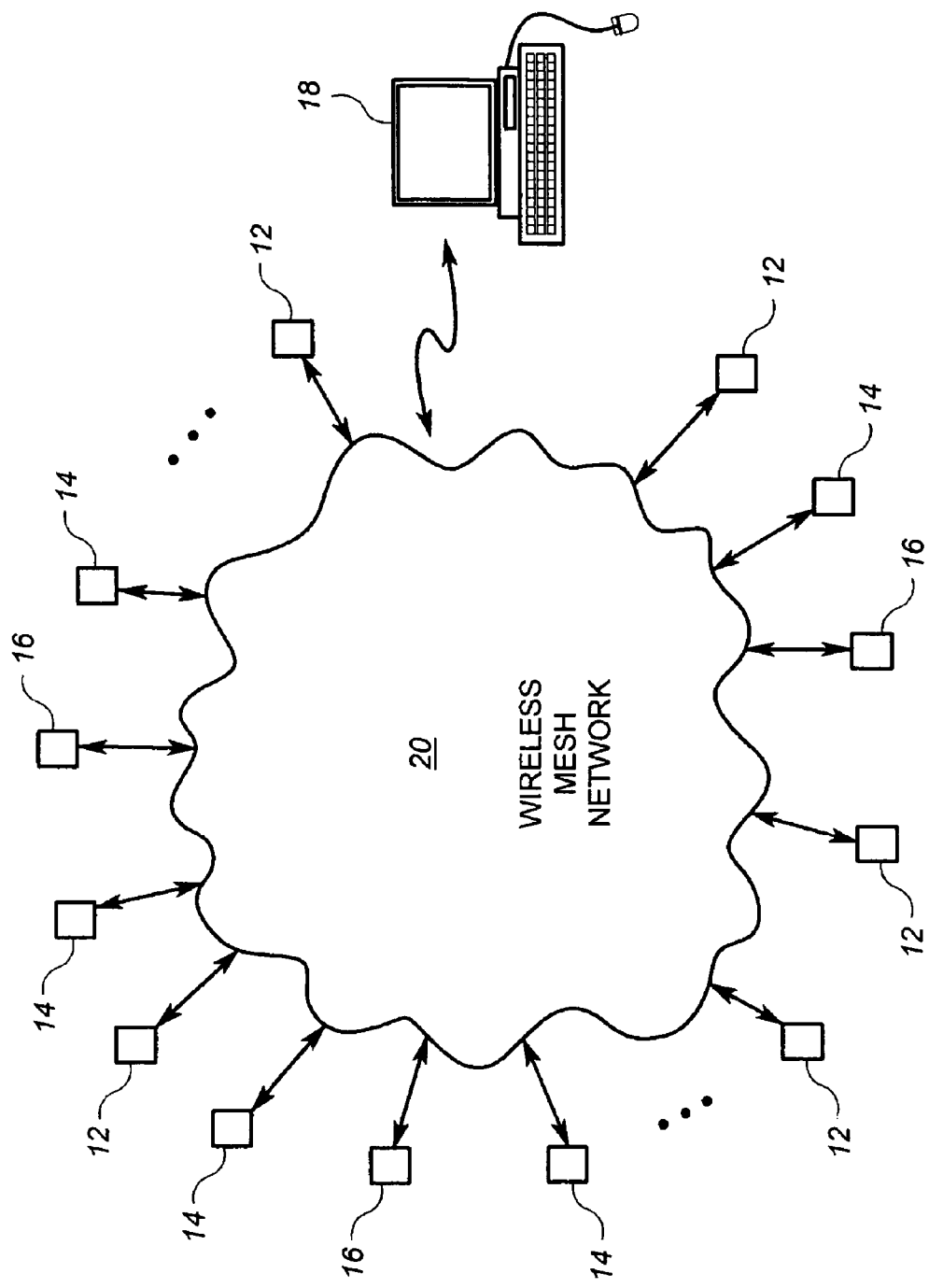
FIG. 1 shows a block diagram of the components of an exemplary arrangement according to some embodiments of the invention.

FIG. 1 shows a block diagram of the components of an exemplary arrangement according to the invention. The arrangement 10 includes a plurality of sensors 12, actuators 14, and controllers 16 that may be part of an HVAC system, security system, fire safety system, lighting control system, or the like. The arrangement 10 also includes a control station 18 and a wireless network 20. The wireless network 20 is configured to allow for, at least in part, communication among the sensors 12, actuators 14, controllers 16 and the control station 18. The wireless network 20 may include at least some wired links, but is primarily wireless at least in the link to and between the sensors 12.

The sensors 12 may suitably include at least some MEMS sensors that sense building parameters such as temperature, air flow, air quality (gas content), light. However, in accordance with the present embodiment, the sensors 12 include more types of sensors preferably disposed in such a manners as to measure extensively various aspects of building operation. For example, sensors 12 may include Hall effect sensors that sense electricity consumption of various parts of the building, and may include motion sensors and the like.

In one embodiment, the wireless network 20 is carried out by short range transceivers that are coupled to and/or formed on the same substrate as, the sensors 12, actuators 14 and/or controllers 16. In particular, at least the sensors 12 are formed as microsystems that include MEMS sensors, processing circuitry, and RF transceivers that are capable of communicating sensor measurements and other data wirelessly. Because sensors 12 (and actuators 14 and controllers 16) are placed throughout the building, the various microsystems may be used to form the wireless mesh network 20. For example, even though each microsystem sensor 12 uses short range RF communications that cannot reach over the entire building, each microsystem sensor 12 may provide a leg in a grid or mesh network that passes information between any two nodes (i.e. sensors 12, actuators 14, controllers 16 and the control station 18). An example of such a network, as well as the microsystems that may be used for communication as well as sensing, control and actuation is provided in U.S. patent application Ser. No. 10/353,142 entitled "Building System with Reduced Wiring Requirements and Apparatus for Use Therein", filed Jan. 28, 2003, and U.S. patent application Ser. No. 10/672,527, filed Sep. 26, 2003, entitled "Building Control System Using Integrated MEMS Device", both of which are incorporated herein by reference.

Preferably, a large number of sensors 12 are provided such that large amounts of data regarding operation of, and conditions in, the building may be obtained by the control station 18. Such information may include comfort information, lighting information, occupancy information and other data from each area of the building. In addition, the sensors 12 may provide energy consumption information on a granular scale relating to each energy consuming device, as well as granular temperature or light information.

The control station 18 is a general purpose computer having sufficient computing power to process data from the various sensors and to implement a knowledge-based operation to improve the operation of the building. By way of example, the general purpose computer may use an expert system or artificial intelligence to learn and apply rules for changing conditions in one or more locations in the building, or to conserve energy.

In one embodiment, the control station 18 employs a genetic algorithm that performs mutations or permutations of control conditions and observes the results to evolve the building control to a more efficient operation. By way of example, the control station 18 may slightly change the output to three of the actuators (for example, changing positions of vents, turning off lights etc.) to see if a certain acceptable condition may be maintained after the change, while providing an advantage in power consumption. The control station 18 evolves such changes and observes the results to determine which mutations should be implemented, and which should not.

Genetic algorithms are known. In accordance with at least one embodiment of the present invention, the inputs to the algorithm include the values from the sensors 12, the actuators 14, and/or the controllers 16, and the outputs may suitable be provided to the actuators 14 and/or controllers 16. The inputs provide granular information regarding the current state of the building, and the outputs allow for the implementation of mutations and evolutions of control strategies. Some mutations may involve changing localized control programs in various controllers 16, while others may adjust actuator operation.

The control station 18 preferably also provides a meaningful way to present such data, such as, for example, presenting data on a navigatible on-line building map or blueprint. The control station 18 preferably allows the user to navigate up and down through view different zoom levels of the building, similar to internet mapping programs, and to observe conditions such as temperature, power consumption, gas content or the like for each observed area, using the appropriate sensor information. An example of a modeling and viewing technique that may be incorporated into the present invention is that disclosed in U.S. patent application Ser. No. 11/169,278, filed Jun. 28, 2005, which is incorporated herein by reference.

Figure 2:
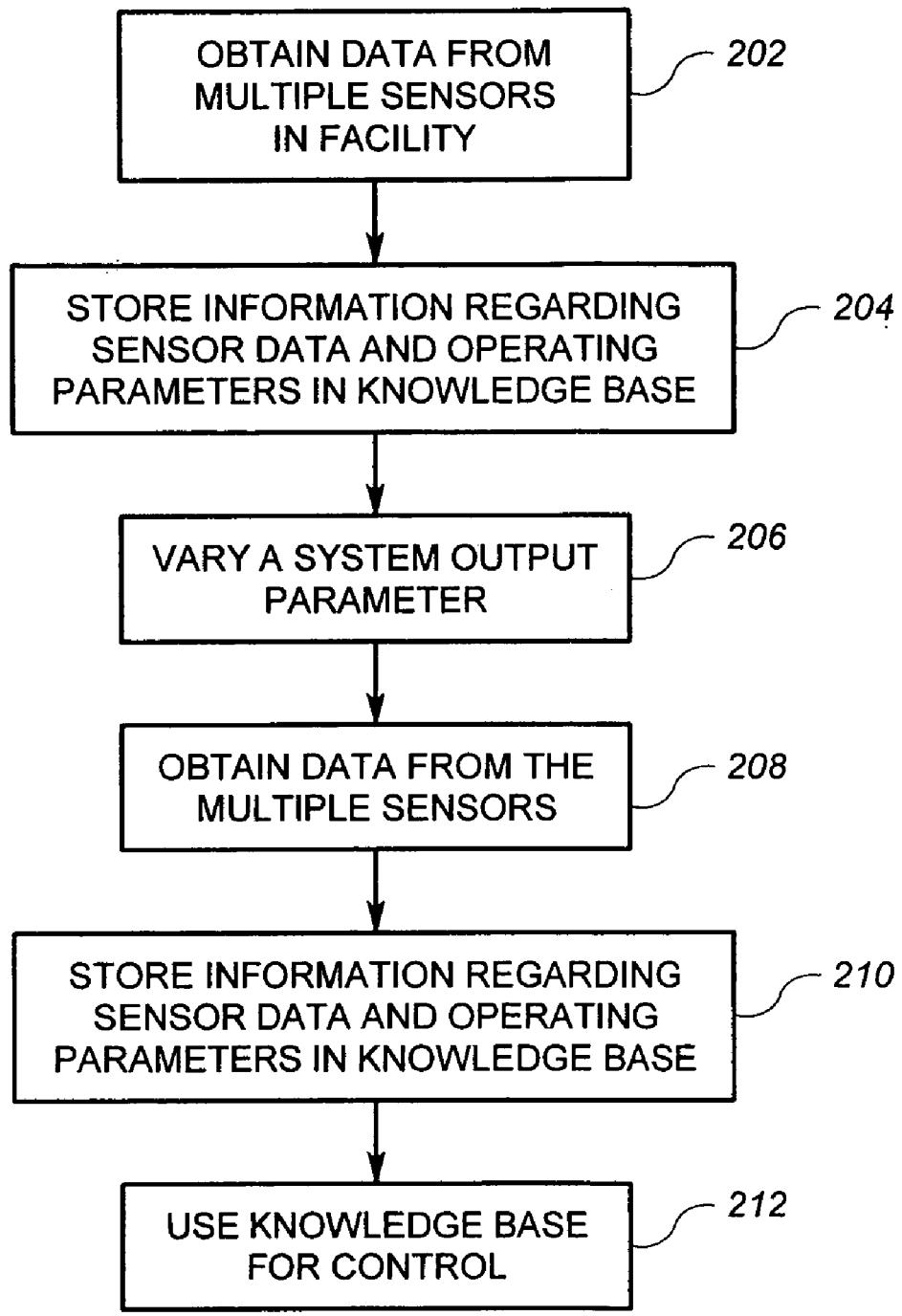
FIG. 2 shows a flow diagram of operations that may be performed by elements of FIG. 1 in accordance with some embodiments of the invention.

FIG. 2 shows an exemplary set of operations that may be carried out by a control device according to the present invention. By way of example, the operations of FIG. 2 may be carried out by the control station 18 to manipulate global conditions in accordance with the invention, or by individual controllers 16 to manipulate their local conditions. For example, the control station 18 may adjust the overall supply air temperature set point, fresh air content, or air handling unit flow rate set point, which affects heating, cooling and ventilation in all spaces of the building. In a different example, each individual controller 16 may adjust room temperature set point, lighting, VAV operation and/or other elements and actuators.

Referring now to FIG. 2, a control circuit (i.e. a controller 16 or the control station 18) obtains data from multiple sensors 12 in step 202. In embodiments in which the control circuit is responsible for devices that affect multiple spaces (i.e. the control station 18, or a controller 16 that controls an air handling unit or the like), the control circuit obtains data from multiple sensors 12 of multiple spaces or rooms throughout the building in step 202. In embodiments in which the control circuit is a localized controller 16 for a defined space or room, the control circuit obtains data from multiple sensors in the space 202.

The sensor data may include information representative of temperature, lighting, motion, air flow, gas content, etc. In addition, in the embodiment of FIG. 1, the sensor data may also include energy consumption of each room, or of particular devices. Such sensor data may be obtained from sensors attached to electrical lines and/or outlets.

In step 204, the control circuit stores the sensor data in a knowledge base in a manner that correlates the sensor data to current system parameters. These parameters may include relevant control outputs and/or other sensed variables, such as outdoor temperature and humidity. The sensor data is correlated to the current system parameters in a manner that allows system behavior for a given set of outputs to be quantified. For example, the sensor data of many rooms or spaces for temperature and humidity may be stored in a manner that is correlated with energy consumption. In addition, the actual temperature and humidity of many rooms can be associated with the temperature and flow rate of the ventilation air for the whole building. As will be discussed below, such information, particularly with more variables and complexity, may be used to determine the best course of action to achieve a desired result under certain conditions. For example, the ventilation (i.e. supply) air temperature and flow rate may be adjusted at some point in an attempt to achieve a certain room temperature and humidity using a relatively low amount of energy. Ideally, the knowledge base will include sets of outputs (system parameters) correlated to sets of sensed data (system conditions, energy consumption), which have been accumulated over time. Step 204 adds to the knowledge base using the current outputs and the sensed data. It will be appreciated that each room controller 16 may have its own knowledge base, and that the control station 18 may also have its own knowledge base.

In step 206, the control circuit causes a first system output to be varied. The system output may suitably be a temperature set point, a lighting set point, an air flow set point or the like. If the control circuit is operable to adjust the operation of an air handling unit, then the system output may be a supply air temperature set point, or a fresh air content set point. If the control circuit is operable to adjust lighting levels throughout one or more spaces of a building, then the first system output that is varied may be the lighting set point.

Thereafter, in step 208, the control circuit obtains new sensor data from the multiple sensors in a manner similar to that of step 202. The obtained sensor data will reflect the effects of the change in the first system output on the system. Because large quantities of wireless sensors are employed, the effects of the change in the first system output may be observed, via the sensor data, on a granular level. For example, it may be determined whether the change has reduced energy consumption while maintaining an adequate comfort level for the occupants.

In step 210, the control circuit stores the new sensor data in the knowledge base in a manner that correlates the sensor data to system parameters, including the changed system output.

At a subsequent time, in step 212, the control circuit uses the information stored in the knowledge base to perform control operations. Thus, over time the control circuit obtains a knowledge base of settings for the control systems under different conditions and the resulting effect on the building control system operation. Step 206 creates mutations that allow the system to "learn" how different changes affect system operation. Thus, the control system uses the learned information to more efficiently control the system. Thus, the control system controls at least partially based on previous experience automatically learned by the system.

Figure 3:
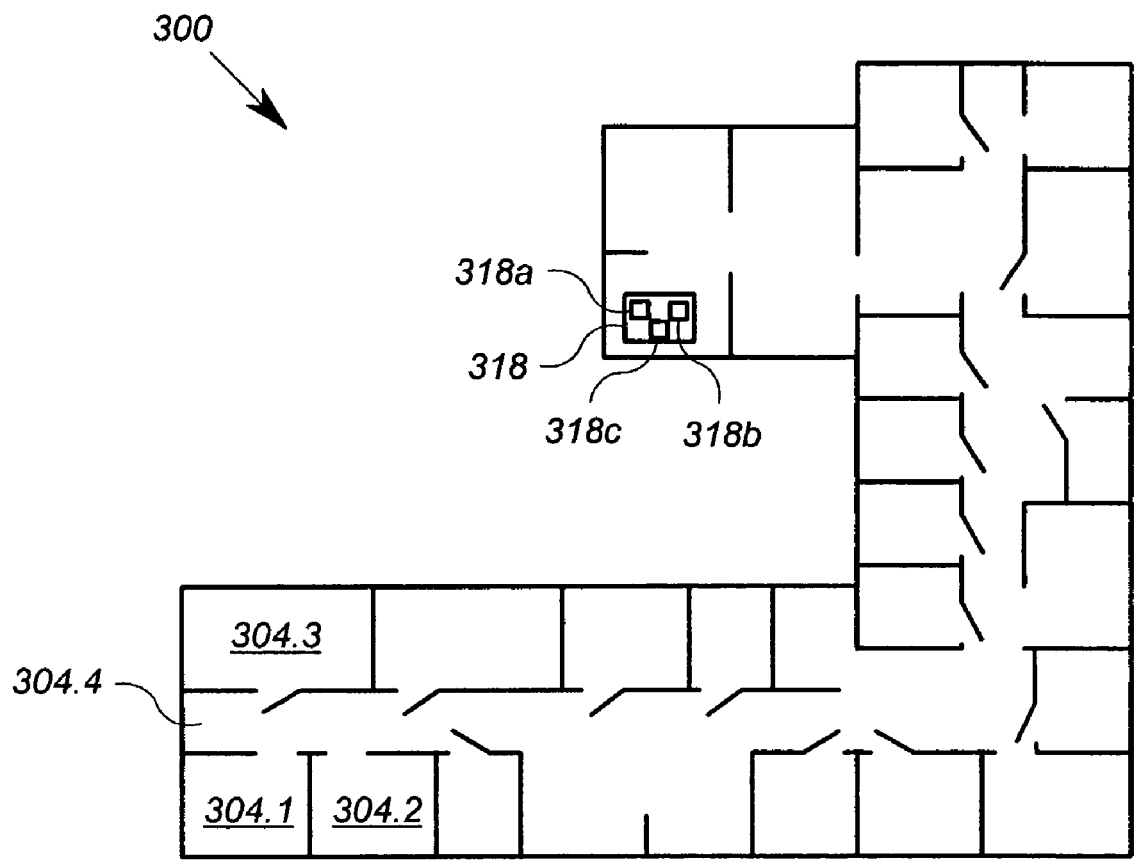
FIG. 3 shows a top floor plan of a building including a control station configured to carry out a method according to a particular embodiment of the invention.

FIGS. 3-8 show in further detail an exemplary embodiment of the invention. The embodiment of FIG. 3 is configured to use a knowledge base, which is generated at least in part by automatic mutation, to control aspects of a building control system. In the example shown in FIGS. 3-8, the goal of the system is to achieve at least a threshold level of indoor environmental quality ("IEQ") while minimizing power consumption throughout the building. It will be appreciated that invention may be used to achieve or approach other system goals, such as, for example, a substantially uniform comfort level or IEQ level throughout, near uniform air flow distribution, or the like.

Referring now to FIG. 3, a top floor plan view of building 300 includes a plurality of spaces, illustrated by way of example as rooms 304.1, 304.2, 304.3 and hallway 304.4. Each of the spaces of the building 300 has a set of building control devices, not shown in FIG. 3, that are used to monitor and affect environmental conditions in a space. The building also includes at least one control station 318, that is operably coupled to exchange data regarding environmental conditions in the various spaces 304.1, 304.2, etc.

The control station 318 may suitably be a general purpose computer, including a data processing device 318*a* and user interface devices 318*b* as is known in the art, which is configured to carry out the operations described herein. The control station 318 further includes one or more standard memory devices 318*c* in which data for the knowledge base may be stored. However, the knowledge base could alternatively be stored in other devices, including in a distributed manner in the microsystems described below in connection with FIG. 4. In any event, the control station 318 may suitably be an INSIGHT™ Workstation or other building systems control station computer, programmed and/or otherwise modified to carry out the operations ascribed to the control station 318 as described herein.

Figure 4:
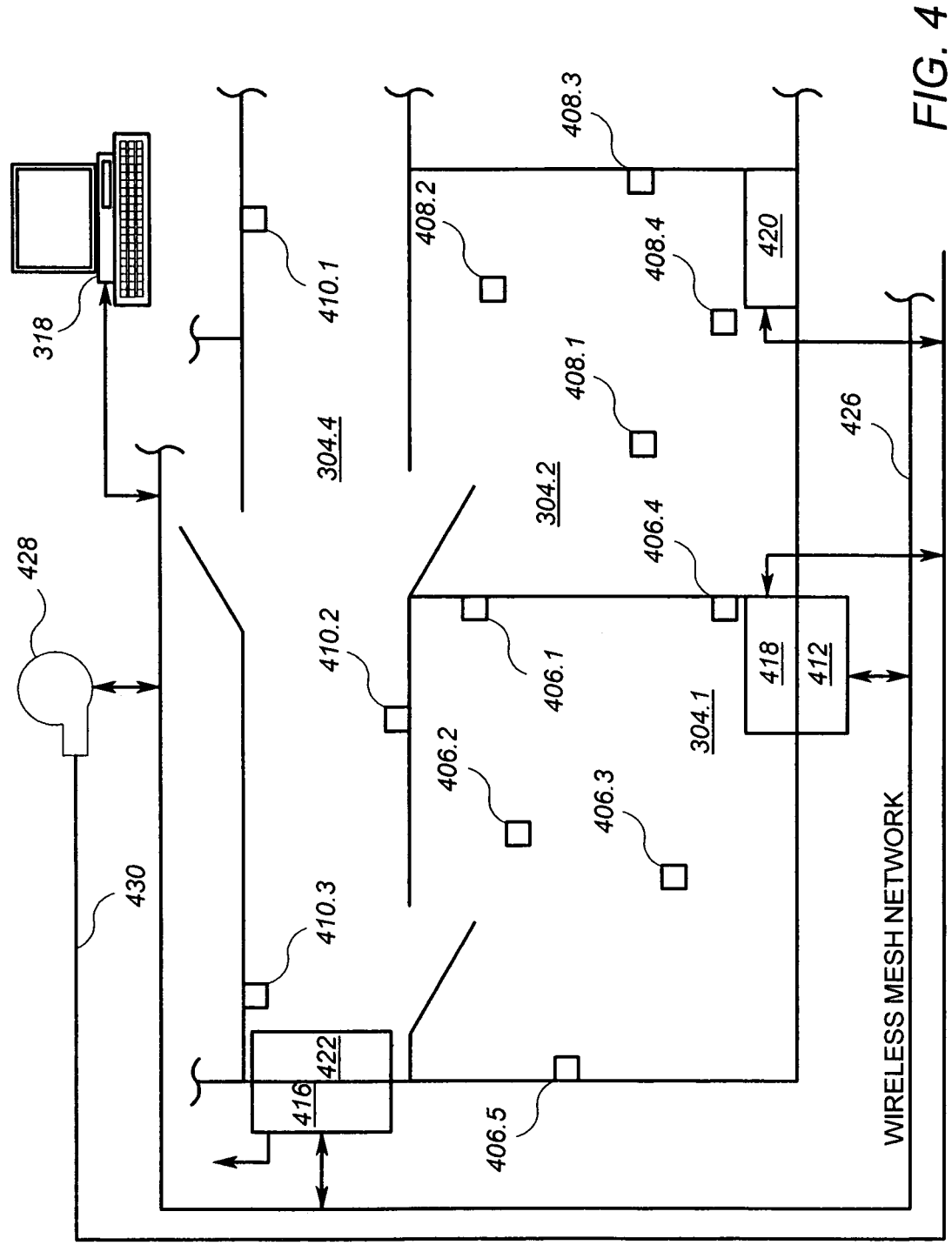
FIG. 4 shows a more detailed fragmentary top floor plan of the building of FIG. 3 including an arrangement according to an embodiment of the invention.

FIG. 4 shows in further detail a combination floor plan/block diagram schematic of the portions the building 300 of FIG. 3. FIG. 4 shows rooms 304.1, 304.2, a portion of the hallway 304.4, and the control station 318. As discussed above, each room or space has a set of devices that cooperate to allow monitoring of and/or control of environmental conditions in the room or space. Each room of the building 300 may be configured similarly to rooms 304.1 and 304.2 as shown in FIG. 4.

Referring specifically to FIG. 4, the room 304.1 includes a plurality of microsystems 406.1-406.5, and a variable air volume ("VAV") unit 418. The microsystems 406.1-406.5 are wireless sensor and communication devices that have the capability to measure a plurality of IEQ-related values, preferably including one or more non-traditional HVAC values such as total volatile organic compounds, $CO_2$, CO, light, or sound. In the embodiment described herein, the microsystems 406.1-406.5 can measure temperature, humidity, TVOCs, $CO_2$, CO, light and air flow. As discussed above, technology for combining multiple MEMs type sensors is known in the art.

It will be appreciated that other microsystems, not shown, may be placed at the electrical circuits of each room and configured to measure energy consumption. In other embodiments, normal energy measurement devices may be used on much less granular scale. In general, the control circuits such as the control station 318 may obtain energy consumption information from such microsystems or energy measurement devices.

Figure 5:
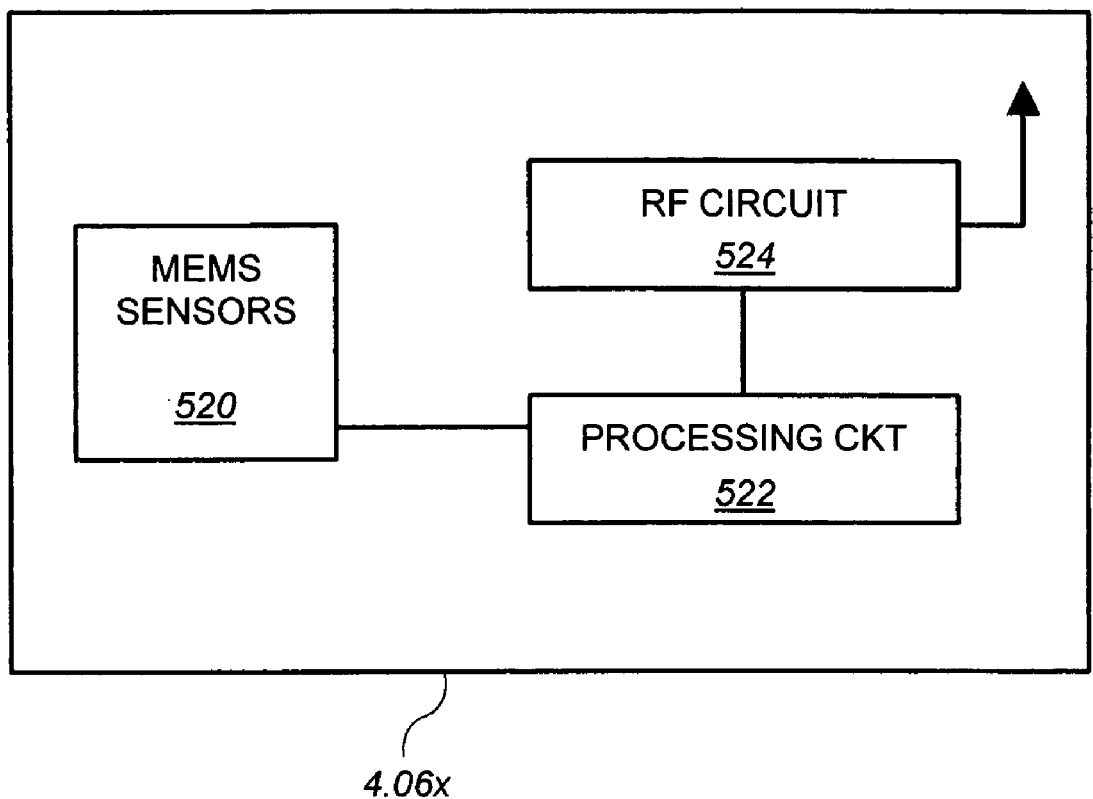
FIG. 5 shows an exemplary embodiment of a microsystem that may be employed in the arrangement of FIG. 4.

Referring again to the microsystems 406.*x*, FIG. 5 illustrates an exemplary configuration of a microsystem that may be used as the microsystems 406.1-406.5. Referring to FIG. 5, the current state of the art of microsystems is sufficient to create a microsystem operable to measure and/or monitor IEQ parameters such as total volatile organic compounds (TVOC), temperature, mean radiant temperature, air flow rate, CO, CO2, relative humidity, light level, and even sound. Each microsystem 406.*x* therefore includes MEMS sensors 520 that measure some or all of these values. The microsystem 406.*x* may also incorporate processing circuitry 522, as well as radio frequency transmission circuitry 524. General examples of MEMS devices having processing circuitry and RF capability are discussed in U.S. patent application Ser. No. 10/353,142 entitled "Building System with Reduced Wiring Requirements and Apparatus for Use Therein", filed Jan. 28, 2003, and U.S. patent application Ser. No. 10/672,527, filed Sep. 26, 2003, entitled "Building Control System Using Integrated MEMS Device", both of which are incorporated herein by reference. Other devices of this nature are known.

In one embodiment, the processing circuitry 522 is programmed or otherwise configured to generate an IEQ index based on the various information obtained by the MEMS sensors 520, and cause the RF circuit 524 to communicate that index wirelessly to another device on a wireless mesh network in the building, or to a device that is connected to a wired network. (See FIG. 4). In other embodiments, the processing circuitry 522 does not generate an IEQ index, but rather obtains the sensor values and provides those values (preferably with some low pass filtering) to the RF circuit 524 for transmission onto the network. The RF circuit 524 may suitably use Bluetooth or other short range RF transmission technology. The microsystem 406.*x* may further include a battery, not shown, to power the operations.

Referring again to FIG. 4, the VAV unit 418 is a device known in the art that is used to control the flow of air into the space 304.1 from a ventilation shaft 430, shown only schematically in FIG. 4. The air flowing from the ventilation shaft 430 may be heated or chilled, and is provided from an air handling unit 428 at a remote location within the building, as is known in the art. In general, the air handling unit 428 is a system known in the art that provides the ventilation shaft 430 "supply air" having a controlled temperature, and including a controlled ratio of fresh (outside) air to recirculated air, at a controlled air flow rate. Thus, a typical air handling unit 428 is operable to provide supply air having a more or less known temperature, flow rate, and fresh air content.

On the room level, the VAV unit 418 may alter the temperature of the room 304.1 by increasing or decreasing the flow of the supply air. The VAV unit 418 may also include heating or cooling coils that are capable of locally altering the temperature of the air flowing into the room 304.1. As is also known in the art, the VAV unit 418 further includes an actuator, not shown separately, that is operable to translate control signals to movement of a mechanical damper that increases or decreases the flow of air into the room 304.1.

Each of the microsystems 406.1-406.5 is operable to communicate wirelessly to a network device in the form of a proximally located field controller 412. The field controller 412 may take the general form of a control device in a commercially available building automation system field panel, which has been modified to include short range wireless communication capabilities for communication with the microsystems. However, in some embodiments, the field controller 412 may simply comprise another wireless microsystem device, such as is the case in the system disclosed in U.S. patent application Ser. Nos. 10/353,142 and 10/672,527, both of which are incorporated herein by reference. In this embodiment, the field controller 412 may suitably be a wireless microsystem that includes at least processing and RF circuitry.

The field controller 412 is also operably coupled to control the operation of the VAV unit 418. In general, the field controller 412 is operable to generate control signals for the VAV unit 418 in order to control the temperature and/or other environmental conditions within the space 314. In accordance with aspects of the present invention, the field controller 412 is also operable to generate a metric regarding the indoor environmental quality (IEQ) of the room 304.1. The field controller 412 is also operably configured to communicate with the control station 318 via a network 426.

Similar to the room 304.1, the room 304.2 includes a plurality of microsystems 408.1-408.4, and a VAV unit 420. The microsystems 408.1-408.4 are wireless sensor and communication devices that are preferably identical to the microsystems 406.1-406.5, and thus have the capability to measure a similar set of IEQ-related values. The VAV unit 420 is preferably similar to the VAV unit 418 in design and capability.

Each of the microsystems 408.1-408.4 is operable to communicate wirelessly to the proximally located field controller 412. The field controller 412 is also operably coupled to control the operation of the VAV unit 420. As with the VAV unit 418, the field controller 412 is operable to generate control signals for the VAV unit 420 to control the temperature and/or other environmental conditions within the space 304.2. In accordance with aspects of the present invention, the field controller 412 is also operable to generate a metric regarding the indoor environmental quality (IEQ) of the room 304.2.

Thus, the field controller 412 is shared in this embodiment by the rooms 304.1 and 304.2. In general, the field controller 412 will typically generate control signals for VAV units (or other devices) for one or more rooms. However, the field controller 412 will typically not control a large number of spaces or rooms in the building 300. In the embodiment described herein, each field controller such as the field controller 412 may suitably be associated with one or two rooms, or about 1000 square feet of large open area, in order to limit the distance over which wireless communication with each rooms' microsystems must take place. In other words, if the field controller 412 were associated with a large number of rooms, then the field controller 412 may be relatively distant from some of the rooms. In such a case, the microsystems of the distant rooms may require more power to carry out the necessary communications. The requirement of higher transmission power for is undesirable because it taxes the limited energy resources on the microsystem. However, it is possible that each room could have a single hub microsystem unit that has wired power which could act as a relay between the wireless microsystems of each room and the field controller 412.

In some embodiments, it is advantageous for the various wireless microsystems to form a network of wireless links between any individual wireless microsystem and the field controller 412. In these alternative cases, a field controller may be used to control many more than two rooms.

The hall space 304.4 may also include a set of devices similar to those found in the rooms 304.1 and 304.2. For example, the portion of the hall space 304.4 shown in FIG. 4 includes a plurality of microsystems 410.1-410.3, and a VAV unit 422. The microsystems 410.1-410.3 are wireless sensor and communication devices that are preferably identical to the microsystems 406.1-406.5, and thus have the capability to measure a similar set of IEQ-related values. The VAV unit 422 may suitably be similar to the VAV unit 418 in design and capability, although it may constitute a model more suitable for hallways, as would be known to those of ordinary skill in the art. Each of the microsystems 410.1-410.3 is operable to communicate wirelessly to a different field controller 416.

The field controller 416 may suitably have a similar design as the field controller 412, and is operably coupled to control the operation of the VAV unit 422. The field controller 416 is operable to generate control signals for the VAV unit 422 to control the temperature and/or other environmental conditions within the portion of hall space 304.4 shown in FIG. 4. In accordance with aspects of the present invention, the field controller 416 is also operable to generate a metric regarding the indoor environmental quality (IEQ) of the hall space 304.4.

Thus, the field controller 416 is separate from the field controller 412 that controls/monitors the environment of the rooms 304.1 and 304.2.

Both field controller 412 and 416 are operably connected to the network 426. The network 426 allows the field controllers 412 and 416 to communicate with each other, as well as with the control station 318. In this embodiment, the network 426 is a wireless mesh network. Thus, the field controllers 412 and 416 preferably include an RF transceiver capable of communicating on a wireless network such as the wireless network described in U.S. patent application Ser. No. 10/353,142, the disclosure of which is incorporated herein by reference. Any of the wireless networks described in U.S. patent application Ser. No. 10/353,142 may suitably be employed as the network 426.

As discussed above, the control station 318 may suitably be a general purpose computer configured to carry out the operations described herein. In general, the control station 318 provides a centralized location at which a human technician or operator may monitor and/or control conditions in the spaces 304.1, 304.2 and 304.4 (as well as other spaces) via the field controllers 412, 416. In this embodiment, the control station 318 is also operable to change the operating parameters of the air handling unit 428. In particular, the control station 318 is preferably able to provide a supply air temperature set point $T_{sa}$, supply air flow set point $FL_{sa}$, and a fresh air content set point $FAR_{sa}$ to the air handling unit 428. As is known in the art, the air handling unit 428 has corresponding control devices, dampers and sensors that cooperate to cause the air handling unit 428 to produce the supply air in accordance with the set points $T_{sa}$ $FL_{sa}$ $FAR_{sa}$ provided by the control station 318.

In operation, the various devices in FIG. 4 operate to control the environmental conditions of the areas 304.1, 304.2 and 304.4. To this end, the field controllers 412 and 416 control the operation of the VAV units 418, 420 and 422 to control at least some conditions in the rooms 304.1, 304.2 and 304.4. In addition, the field controllers 412 may also be configured to activate light switches or other environment related devices, not shown. In some embodiments, the field controllers 412 control the lighting level over a variable range using controllable ballasts.

Referring to the room 304.1, the field controller 412 includes the logic that performs control operations to control the flow of heated or chilled air into the room 304.1 in an attempt to maintain the temperature at a desired level. The desired temperature level is a set point value that may be set by an operator via the central control station 318, input at the field controller 412, set by a thermostat device, not shown, within the room 304.1, or otherwise provided to the field controller 412. The field controller 412 compares temperature information received from the various microsystems 406.1-406.5 to the set point value. If the temperature information indicates that the room temperature is too low relative to the set point, then the field controller 412 provides output signals that cause the VAV unit 418 to reduce the flow of chilled air into the room 304.1, or cause the VAV unit 418 to increase the flow of heated air into the room 304.1, depending upon whether the available air flow is of chilled air or heated air.

To accomplish such temperature control, the field controller 412 may suitably use any of a plurality of known control algorithms (PI, PID) to control the VAV unit 418 based on the measured temperature and the set point temperature. Because there are multiple data points regarding the temperature in the room, one for each microsystem 406.1-406.5, the field controller 412 may suitably take the mean or median measured temperature value as the value used for PI or PID control of the VAV unit 418. As is known in the art, the field controller 412 receives the temperature information from the microsystems 406.1-406.5 on a periodic basis, and periodically updates the control calculations based thereon.

In addition, the field controller 412 also obtains from each microsystem 406.1-406.5 an IEQ index value. The IEQ index value is a composite index of various sensed conditions measured by each of the microsystems 406.1-406.5. For example, the IEQ index value might be formed from a combination of values, each value expressing a correlation (or variance) between a measured value and an ideal value for human comfort. As discussed above, the microsystems 406.1-406.5 measure TVOC, $CO_2$, CO, light, temperature, humidity and air flow. The IEQ index may suitably be F ($VAR_{temp}$, $VAR_{hum}$, $VAR_{tvoc}$, $VA_{co2}$, $VAR_{co}$, $VAR_{light}$, $VAR_{flow}$) where the $VAR_x$ values are variances of the value x from an ideal value or range.

By way of example, the value of $VAR_{temp}$ may be a normalized measure of the variance of the temperature from the range of 68° F. to 74° F., the value of $VAR_{hum}$ may be a normalize variance of the variance of the humidity from the range of 40% to 70%. The value of $VAR_{tvoc}$ may suitably be a normalized value representative of the measured total volatile organic compounds that is greater than zero. Similarly, the values $VAR_{co2}$ and $VAR_{co}$ can be a normalized value representative of the measured amount of $CO_2$ and CO, respectively. The value of $VAR_{light}$ and $VAR_{flow}$ may suitably be the variance of the measured light and flow values, respectively from their ideal values. Because the lights in a room may be off when the room is not occupied, the $VAR_{light}$ value may be set to zero if there is evidence that the room is unoccupied. To this end, one or more microsystems may have a motion sensor or other occupancy-like sensor.

It will be appreciate that there are many ways to determine IEQ, including those based on the Indoor Air Quality standards and definitions listed in ASHRAE Standards 55 and 62, which are incorporated herein by reference. The ASHRAE standards also provide information as to what constitutes "ideal" or at least healthy levels of the various IEQ parameters. It may be advantageous to measure other contaminants, such as particulates, biological compounds, inorganic compounds, etc. It will also be appreciated that the weight given to any particular variance from ideal conditions may depend on the needs and goals of building in which the system is implemented.

In any event, with proper normalization, the composite IEQ value provided by each microsystem represents how much the aggregate temperature, humidity, light, flow, TVOCs, $CO_2$ and CO conditions vary from ideal conditions for human beings. If the composite IEQ value from the microsystems is relatively low, then the environmental conditions in the room 304.1 are considered to be of a high standard because conditions are near ideal. If the IEQ index is relatively high, then the environmental conditions in the room 304.1 are considered to be substandard. It will be appreciated that an inverse scale may be used such that a high IEQ index indicates a good environment and a low IEQ index indicates a poor environment.

The IEQ index is useful because it can detect issues with environmental quality even if no single monitored condition is particularly poor. For example, while temperature variations, low air flow, humidity variations and other conditions may generally be controlled through the normal HVAC operations, it is possible that low-normal conditions of all of these parameters in the aggregate may create a relatively poor environmental quality, although no single factor is particularly poor. Thus, it is possible that the HVAC system and lighting system are operating within normal limits for two different rooms, but the aggregate IEQs for the two rooms are very different.

One aspect of the IEQ-measurement capabilities of at least some embodiments described herein relates to the placement of multiple sensor devices in each room, such as the room 304.1. The use of multiple microsystem sensor devices 406.1-406.5 in the room 304.1 allows for a more granular measurement of IEQ within the facility. It is possible that a room generally has a good environment, but that portions of the room or space do not. The granular aspect of this embodiment, by providing multiple measurement devices in each room, obtains information for each portion of the room. The use of multiple microsystem devices in each space or room also overcomes the problem of single-point measurement where the single sensor for a room is placed in a "hot spot" or "cool spot" that is not really representative of the room conditions. Such "hot spots" or "cool spots" may relate to temperature, flow, humidity, light, volatile compound content, CO or CO2. By using multiple microsystems in each room, the chance of an anomalous measurement greatly affecting assessment of building conditions is substantially reduced. This granularity also allows for problems to be detected more quickly, and pin-pointed more readily.

An issue that relate the use of multiple microsystems in each room arises from the fact that light measurements can be affected by things that do not relate to environmental quality. For example, if the microsystem 406.1 were located on a wall that was subsequently covered by a bookcase, then it may detect little or no light despite the fact that the space 304.1 may in general have a sufficient amount of light. One precaution that may be made to avoid artificially low light measurements is to include a motion sensor in the microsystems 406.*x*, 408.*x* and 410.*x*. The motion sensor of the microsystems 406.*x*, 408.*x* and 410.*x* may be used to determine whether a particular microsystem such as microsystem 406.1 is covered or obscured. For example, if the motion sensor of the microsystem 406.1 detects little or no motion over a predetermined period of time (days or months) while other microsystems 406.2-406.5 in the same room 304.1 detect significant amounts of motion, then there is an indication that the particular microsystem 406.1 is covered or obscured. In such a case, the light measurement of the microsystem 406.1 that detects little or no motion may be discarded or at least given little weight.

In alternative embodiments (or in addition), the microsystems 406.*x*, 408.*x* and 410.*x* may be placed on ceilings to avoid being covered. Moreover, if a large number of microsystems are employed throughout a room, then the anomalous light measurements from covered up sensors may be statistically filtered out by averaging or using median values.

In any event, as discussed above, the field controller 412 calculates an IEQ value from each controller 406.1-406.5 and 408.1-408.4, or alternatively or additionally for the rooms 304.1 and 304.2, based on the information from the sensor microsystems in the rooms 304.1 and 304.2. The field controller 412 communicates the IEQ value(s) for each of the rooms 304.1 and 304.2 to the control station 318.

In the embodiment discussed herein, the field controller 412 is also configured to generate an alarm message or signal in response to an out-of-boundaries value for any of the measured values (temperature, humidity, CO2, CO, TVOC, etc.). By way of example the field controller 412 may provide any such alarm messages to the control station 318 or to another network node (i.e. another field controller such as controller 416). The handling and use of alarm messages in a building control system is well known in the art. In addition, the field controller 412 is configured to generate an alarm message based on IEQ values for a microsystem or set of microsystems, even if no individual parameter (e.g. temperature, humidity CO2, CO, flow, TVOC, etc.) is out of normal bounds. For example, it may be that all of the parameters is in the low-normal range, such that no single value is out of range. However, with all conditions in the low normal range, the overall quality of the environment is relatively low, thereby triggering an alarm. The field controller 412 is of course also configured to generate an alarm message based on IEQ values if one or more the individual environmental parameters is out of range.

In general, as with the IEQ values themselves, the field controller 412 provides any IEQ alarm information/message to the control station 318. The control station 318 may suitably handle an IEQ value-based alarm message in a manner similar to temperature or humidity-based alarm messages. The handling of such alarms will vary from system to system, the details of which are omitted herein. In general, each system will provide active and ongoing notification of an alarm condition until the alarm condition is manually acknowledged by an operator.

This type of alarm can alert a system operator to a combination of conditions in a room or space that contribute to a poor overall quality regardless of whether a particular condition is out of normal bounds. Poor environmental quality can lead to reduced productivity and/or reduced health of the people working in the building, both of which are undesirable. The IEQ-related alarm allows such conditions to be detected early, and does not delay notice of poor conditions until one of the individual parameters advances to an alarm-inducing level.

Another advantage of the above-described embodiment is the availability of granular and/or room level IEQ information that may be used by the control station 318 (or other nodes) for monitoring, verification, and/or control of the indoor environmental quality on a building-wide or system-wide basis. As will be discussed below in further detail in connection with FIGS. 6, 7 and 8, the IEQ information (or a value derived therefrom) may be stored in a knowledge base correlated to system outputs and weather conditions and power consumption. Such a knowledge base may be used to more efficiently control the building systems.

For example, it may be possible to change a number of parameters in the operation of an air handling unit such as the air handling unit 428 to achieve an adequate IEQ index for the spaces in the building. Indeed, there may be several combinations of fresh air content, supply air temperature and supply air flow that may provide adequate comfort and/or adequate IEQ in each of the rooms 304.1, 304.2 and 304.4. However, some of those combinations may be more energy efficient than others. Furthermore, changes in weather can change not only which combinations are suitable, but even which are the most efficient.

For example, if the outdoor temperature is 72°, and the relative humidity is 50%, then it may be suitable to include a large percentage of fresh air content in the supply air because the fresh air is relatively cool and dry. It may also be suitable to include very little outside air in the supply air, and to instead rely on additional cooling of recirculated air. However, the latter solution would likely require much more energy because of the increased cooling needs. By contrast, if the outdoor temperature is 72° and the relative humidity is 90%, the efficiencies of the solutions may change. For example, if the supply air contains a lot of fresh air, then the supply air would require additional cooling to combat the negative effects of increased humidity within the fresh air. If, however, the supply air includes a reduced amount of fresh air, less cooling may be necessary because the reduced fresh air does not raise the heat index in the building as much. In this example, less energy is required when the fresh air content is reduced.

These simplified examples illustrate how a simple change in weather conditions can require a much different solution if efficiency is the goal of the solution.

Figure 6:
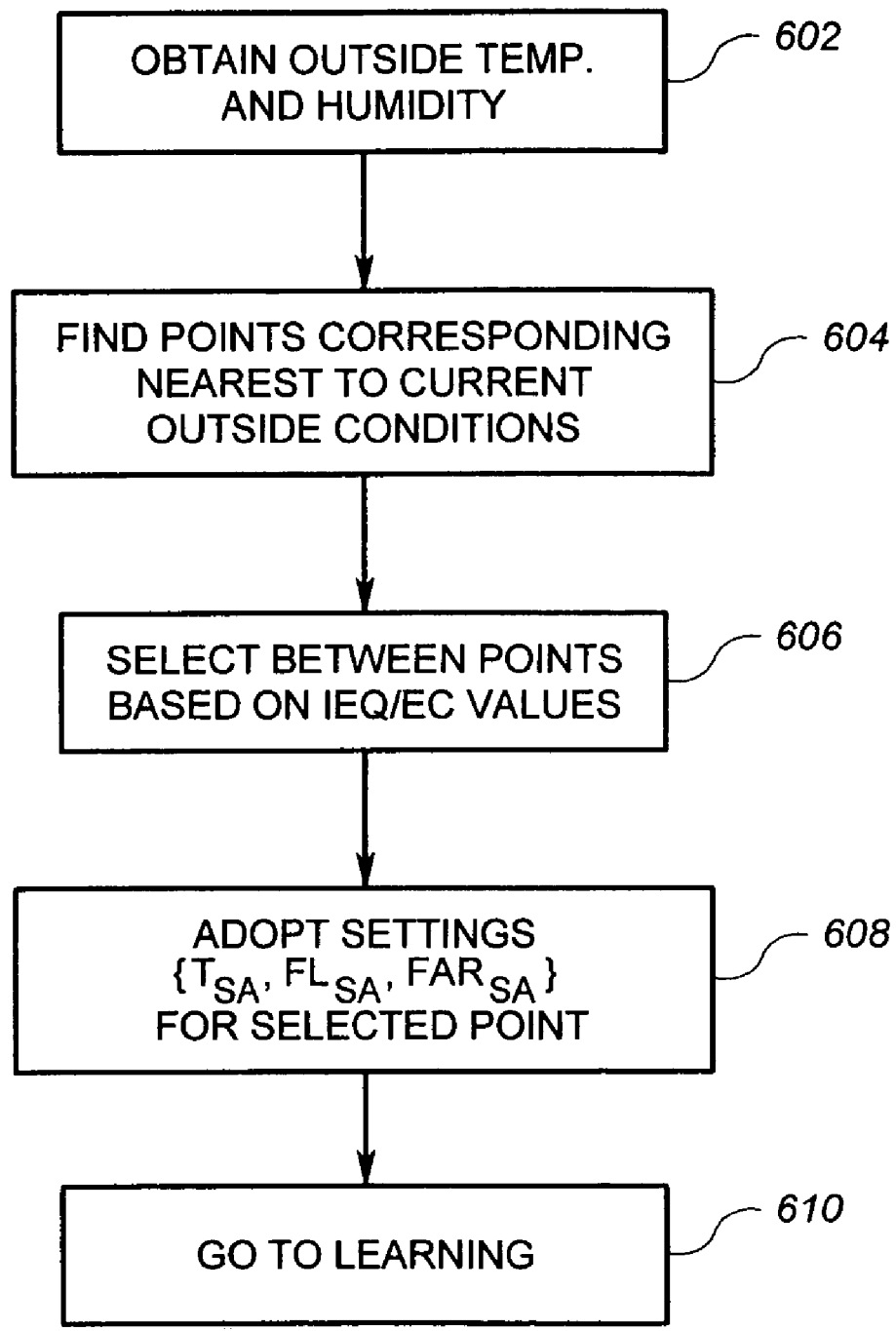
FIG. 6 shows a flow diagram of an exemplary set of operations that may be carried out the control station of FIGS. 3 and 4.
Figure 7:
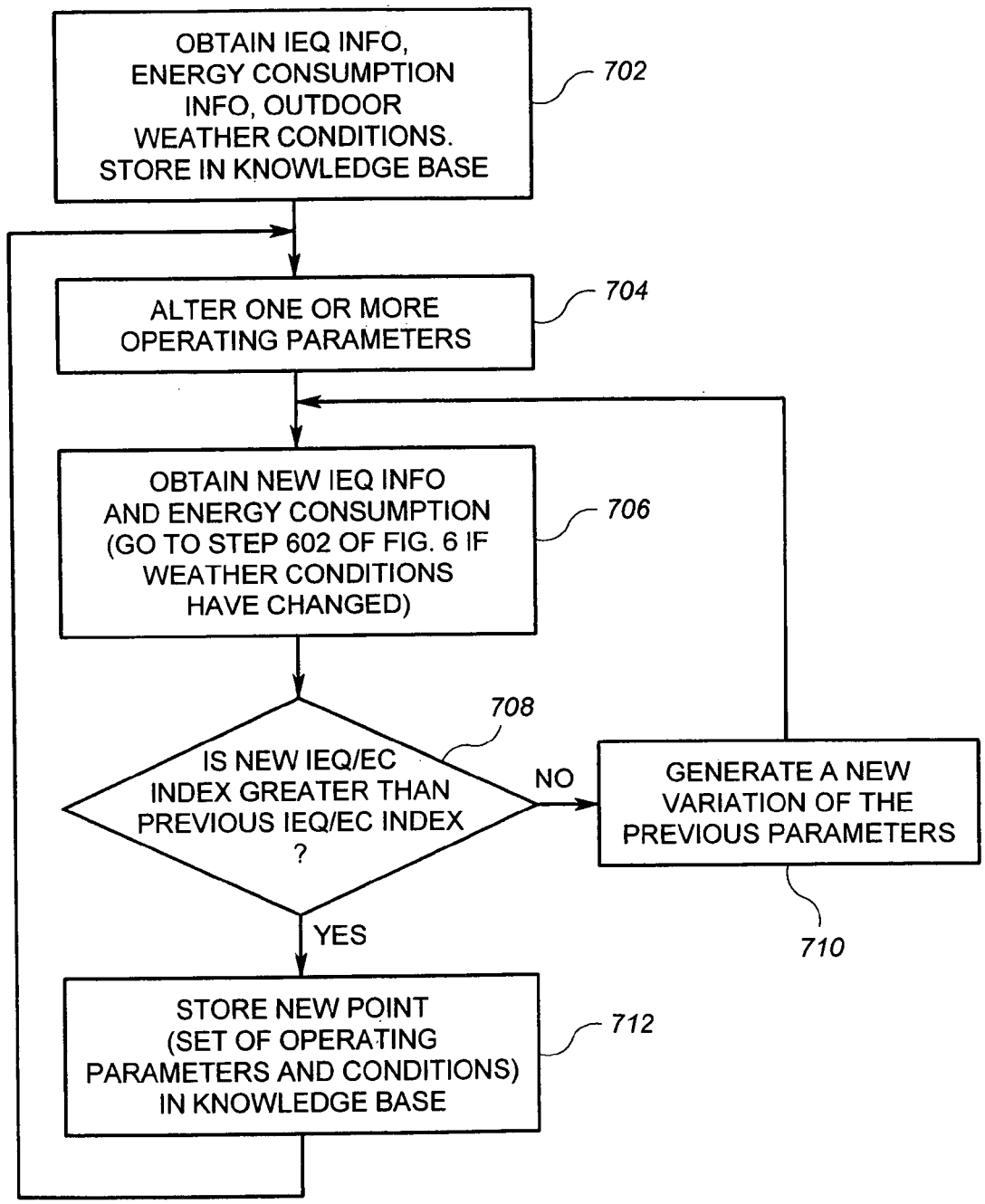
FIG. 7 shows a flow diagram of another exemplary set of operations that may be carried out the control station of FIGS. 3 and 4.
Figure 8:
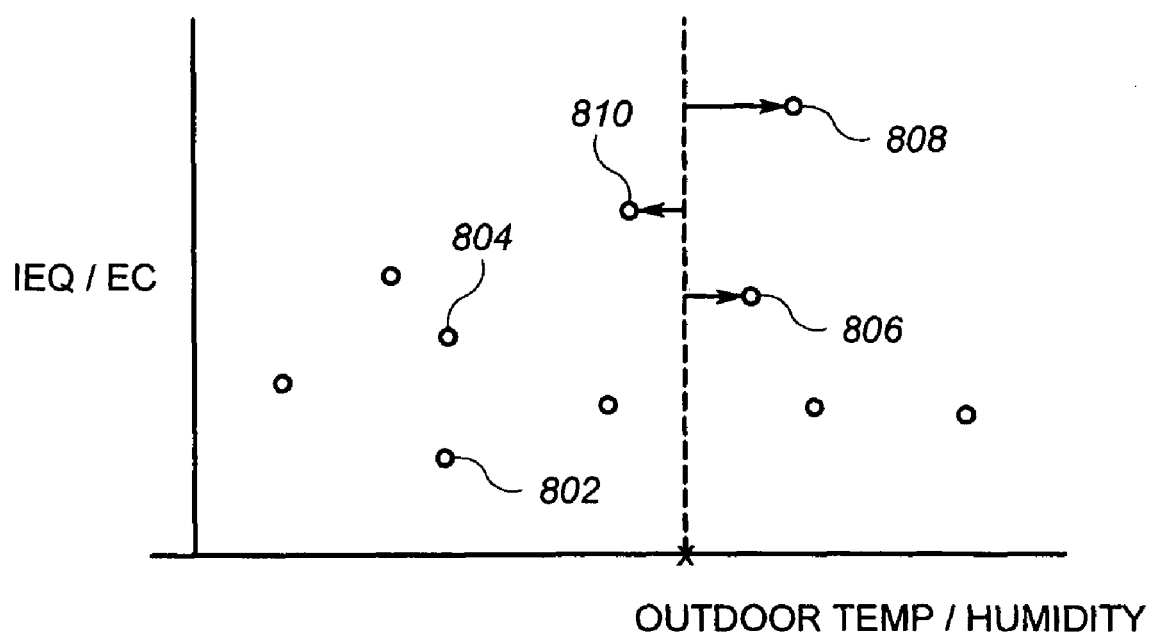
FIG. 8 shows a graph that represents a visual depiction of an exemplary knowledge base according to the embodiment of FIGS. 3 and 4.

FIGS. 6, 7 and 8 illustrate a simplified example of how a knowledge base of operating conditions for the air handling unit 428 under different weather conditions, along with IEQ information, may be used to increase the energy efficiency of the operation of an air handling unit.

FIG. 6 illustrates a process by which a knowledge base is used in the control of the air handling unit 428 based on outdoor weather conditions. It will be appreciated that the example is necessarily simplified for illustrative purposes, and that many other factors may be considered in the control of the air handling unit 428. Moreover, many more operating parameters that control aspects other than the air handling unit 428 may be controlled using similar methods. The operations of FIGS. 6 and 7 are carried out herein by the processing circuit 318a of the control station 318.

In step 602, the control station 318 obtains weather information, such as the outdoor temperature and relative humidity. (In other embodiments, the amount of sunlight, pollution index, and pollen index may also be monitored). In any event, the processing circuit obtains information regarding the "fresh air" that can be added to the supply air.

In step 604, the control station 318 attempts to identify, using the knowledge base, a set of operating parameters for the air handling unit 428 that are particularly efficient at helping achieve a satisfactory IEQ index for each room 304.1, 304.2 and 304.4, and which has a high efficiency. In particular, FIG. 8 shows a graph that illustrates "points" in a knowledge base. Each point 802-810 represents a set of operating parameters (e.g. supply air temp, supply air flow, fresh air content or $\{T_{sa}, FL_{sa}, FAR_{sa}\}$). These points represent sets of operating parameters $\{T_{sa}, FL_{sa}, FAR_{sa}\}$ where the IEQ index throughout the building has been found to be adequate. The point are shown indexed by the outdoor heat index, which is a combination of temperature and relative humidity. These points are plotted against a ratio of IEQ to energy consumption. The goal of the system is to maximize the IEQ to energy consumption (EC) ratio.

Thus, for example, points 802 and 804 represent two different sets of operating parameters $\{T_{sa}, FL_{sa}, FAR_{sa}\}$ of the air handling unit 428 under nearly identical heat index conditions. However, the set of parameters corresponding to point 804 has a higher IEQ/EC ratio and is therefore more efficient for that particular set of weather conditions. The points of the graph in FIG. 8 are obtained by the learning operations of the processing circuit, which are discussed further below in connection with step 610 and FIG. 7.

Referring again to step 604, the processing circuit selects a number of points having corresponding heat index values that are relatively close to the current outdoor weather conditions. For example, referring again to FIG. 8, if the outdoor heat index value is the value at point 812, then point 806 and 810 are the closest. In other words, the heat index associated with points 806 and 810 are both closer to the actual heat index value at 812 than the other points in the graph.

In step 606, the control circuit 318 selects among the points identified in step 604 based on the IEQ/EC ratios. Thus, in the example shown in FIG. 8, the processing circuit would select the point 810 over the point 806 because it has a higher IEQ/EC ratio.

It will be appreciated that more complex algorithms may be used to select the point of the graph. For example, an algorithm may consider points corresponding to heat indices that are further away, if such points have an extremely high IEQ/EC ratio. For example, an algorithm enable selection of point 808 in FIG. 8 because it is somewhat close to the heat index 812 and has an extremely high IEQ/EC ratio. It will also be appreciated that the use of a combined heat index for temperature and humidity is provided by way of example only. In other embodiments, the "graph" of FIG. 8 may suitably be replaced by a multidimensional array having independent indices of temperature, humidity, and even light, pollution level and/or pollen content. Even with multi-dimensional arrays, the control station 318 would look among the closest points (with respect to temperature, humidity, light, pollution and/or pollen) and select the one with the highest IEQ/EC.

In any event, after 606, the control station 318 has selected a point, which means that a set of relatively efficient operating parameters for the air handling unit 428 have been identified. Therefore, in step 608, the control station 318 obtains the parameters $\{T_{sa}, FL_{sa}, FAR_{sa}\}$ associated with the selected point from the knowledge base, and controls the air handling unit 428 accordingly. Thus, the processing circuit of the control station 318 may suitably send the values $T_{sa}, FL_{sa}, FAR_{sa}$ as the new set points for the air handling unit operation.

Once the operating parameters have been adopted, then in step 610, the processing circuit engages in a learning operation in which the system parameters (e.g. $T_{sa}, FL_{sa}, FAR_{sa}$) are mutated and the results observed. With the wireless network of microsystem sensors 406.x, 408.x, 410.x, large scale granular measurement of changes to the system may be obtained and provided to the control station 318 relatively conveniently. This learning process helps increase the knowledge base, which may be thought of as adding points to the graph of FIG. 8.

FIG. 7 shows in further detail the operations of the control station 318 in connection with the mutation and knowledge base learning operation of step 610 of FIG. 6.

In step 702, the control station 318 obtains the IEQ information for the building, energy consumption (EC) information, and the outdoor environment conditions (e.g. heat index). This information provides the information necessary to provide a point on the graph of FIG. 8.

It is will be appreciated that the use of IEQ as a measure of the acceptability of the environment in the building provides advantages that other embodiments do not. In particular, as discussed above, different factors make a comfortable and healthy work environment. It may be possible that different control parameters under different conditions affect the IEQ in different ways to achieve a healthy environment. In this embodiment of the knowledge base, the control station seeks the most efficient way to achieve an acceptable environment, without necessarily focusing on a single variable such as temperature alone. However, other embodiments may simply use an index of temperature and humidity, or some other subset of elements of and IEQ index.

In any event, it is assumed in step 702 that the current conditions that the system have stabilized and that the minimum acceptable IEQ index has been achieved for the spaces in the building. The resulting IEQ measure, EC value (which may be the energy consumption of the air handling unit 428 itself, measured by an energy consumption meter), and the outdoor weather conditions are then stored as part of the knowledge base.

In step 704, the control station 318 alters one of the parameters $T_{sa}, FL_{sa}$, or $FAR_{sa}$, preferably by a relatively small amount. The purpose of the variation is to attempt to mutate or evolve to a more efficient operation. Thus, the control station may cause the air handling unit 428 to change its temperature set point to a slightly higher value. In some case, multiple parameters may be changed. For example, the control station may cause the air handling unit 428 to slightly increase supply air flow, and slightly decrease the fresh air content. The selection of which parameter or parameters to vary is preferably randomized. The amount of each variation should be slight.

In any event, in step 706, the control station 318 obtains the new IEQ information for the building, and new energy consumption (EC) information, that result from the varied parameters. This information again is obtained after the system has stabilized and that the IEQ index is adequate for the building. For the sake of completeness, the outdoor environment conditions (e.g. heat index) may also be obtained, as those conditions will change over time. If the change in outdoor environmental conditions is more than a deminimus amount, then the control station 318 leaves FIG. 8 and proceeds to step 602 of FIG. 6.

Assuming that weather conditions have not changed appreciably, the control station 318 proceeds to step 708. In step 708, the control station 318 determines whether the new IEQ/EC index is greater than the IEQ/EC index determined based on the values of IEQ and EC from step 702. If not, then the variation/mutation does not appear to be leading to a better solution for the operation parameters of the air handling unit 428. In such a case, the control station generates a different variation from the original (i.e. step 702) the previous settings $\{T_{sa}, FL_{sa}, FAR_{sa}\}$ for the air handling unit 428 in step 710. After step 710, the control station returns to step 706 to observe how those changes affect the system in the manner described above.

Referring again to step 708, if the control station 318 instead determines that the IEQ/EC ratio for the varied parameter set is greater than the IEQ/EC ratio for the original parameter set, then it appears that the variation/mutation is leading to a better solution for the operation of the air handling unit under current weather conditions. In such a case, the control station 318 proceeds to step 712. In step 712, the control station stores the set of parameters in the knowledge base, indexed by the weather conditions and the IEQ/EC ratio (i.e., creating a new point on the graph of FIG. 8). The control station 318 also adopts the new parameters $\{T_{sa}, FL_{sa}, FAR_{sa}\}$ as the current parameters and returns to step 704 to conduct an addition variation/mutation of the parameters. Step 712 thus helps populate the experience knowledge base of the system.

The above described operations illustrate one example of how a knowledge base, along with the availability of granular sensor values for the building 300 may be used to improve efficiency while maintaining a healthy environment within the building. Other examples identified by those of ordinary skill in the art may employ the operations of building a knowledge base through measurement with wireless microsystems and mutation of operating parameters, and to use such a knowledge base to help at least assist in the control of multi-variable processes.

It is noted that some embodiments may not require a field controller. For example, in an alternative embodiment, the microsystems 406.x, 408.x and 410.x may communicate with the control station via a wireless network. As discussed above, each of the microsystems 406.x, 408.x and 410.x includes wireless communication capability. Because the network of microsystems 406.x, 408.x and 410.x extends throughout the building 300, a path may be drawn between any microsystem 406.x, 408.x and 410.x to the control station 318 through a daisy chain connection of microsystems such that no single microsystem requires a long range RF communication capability.

I claim:

1. An arrangement for use in a control system within a building, the control system having system outputs corresponding to a set of operating parameters, the arrangement comprising:
a plurality of sensor microsystems configured to obtain environmental information regarding a plurality of areas in the building; while said building is operating on-line;
a processing circuit configured to
obtain data representative of the environmental information regarding the plurality of areas in the building operating on-line under a first set of operating parameter values corresponding to the set of operating parameters;
cause the building control system to operate on-line under a second set of operating parameter values, wherein a first parameter of the set of operating parameters has a changed value;
obtain data representative of the environmental information regarding the plurality of areas in the building operating on-line under the second set of operating parameter values;
store the data representative of the environmental information under the second set of operating parameter values in a knowledge base;
at a subsequent time, employ the knowledge base to generate a subsequent set of operating parameter values.

2. The arrangement of claim 1, wherein the first parameter set of operating parameter values includes information representative of a supply air temperature set point for the building control system.

3. The arrangement of claim 1, wherein the first set of operating parameter values includes a lighting set point for the building control system.

4. The arrangement of claim 1, wherein the first set of operating parameter values includes information relating to a fresh air mixture of supply air for the building control system.

5. The arrangement of claim 1, further comprising a communication link between each microsystem and the processing circuit.

6. The arrangement of claim 5, wherein at least a first microsystem forms a part of a communication link between a second microsystem and the processing circuit.

7. The arrangement of claim 1, wherein the plurality of microsystems includes at least one wireless microsystem.

8. The arrangement of claim 7, wherein each of the plurality of microsystems include at least one MEMS sensor.

9. The arrangement of claim 1, wherein each of the plurality of microsystems include at least one MEMS sensor.

10. The arrangement of claim 1, wherein the environmental information regarding the plurality of areas in the building include information based on temperature, humidity and content of at least one gas.

11. An arrangement for use in a control system within a building, comprising:
a plurality of sensor microsystems operable to obtain environmental information regarding a plurality of areas in the building; while said building is operating on-line;
a processing circuit operable to store data representative of the obtained environmental information regarding the plurality of areas in the building in a knowledge base, said knowledge base correlating obtained environmental information to each of a plurality of operation conditions to which the obtained environmental information corresponds, and employ the knowledge base to adjust operating parameter values of at least one device in the building control system; while said building is operating on-line;
wherein the plurality of sensor microsystems are at least indirectly coupled to the processing circuit via wireless links.

12. The arrangement of claim 11, wherein the knowledge base correlates operating parameters of at least one device with information regarding measured conditions within the building.

13. The arrangement of claim 12, wherein the knowledge base further correlate operating parameters with corresponding energy efficiency information.

14. The arrangement of claim 12, wherein each of a set of microsystems of the plurality of microsystems includes a MEMS temperature sensor.

15. The arrangement of claim 14, wherein each of the set of microsystems includes a MEMS humidity sensor.

16. The arrangement of claim 15, wherein each of the set of microsystems includes at least one additional sensor.

17. The arrangement of claim 15, wherein each of the set of microsystems includes an RF circuit.

18. A method for use in a building control system having system outputs corresponding to a set of operating parameters, the method comprising:
  a) obtaining environmental information regarding a plurality of areas in a building using a plurality of sensor microsystems, the building operating on-line under a first set of operating parameter values corresponding to the set of operating parameters for a building control system;
  b) causing the building control system to operate on-line under a second set of operating parameter values, wherein a first parameter of the set of operating parameters to has a changed value;
  c) obtaining second environmental information regarding the plurality of areas under the second set of operating parameter values;
  d) storing data representative of the second environmental information under the second set of operating parameter values in a knowledge base; and
  e) at a subsequent time, employing the knowledge base to generate a subsequent set of operating parameter values.

19. The method of claim 18, wherein step d) further comprises correlating the data representative of the second environmental information with information representative of the second set of operating parameter values in the knowledge base.

20. The method of claim 19, wherein step d) further comprises correlating data representative of energy consumption with the second set of operating parameter values in the knowledge base.

* * * * *